United States Patent
Hull

(10) Patent No.: US 6,885,985 B2
(45) Date of Patent: Apr. 26, 2005

(54) TERMINOLOGY TRANSLATION FOR UNALIGNED COMPARABLE CORPORA USING CATEGORY BASED TRANSLATION PROBABILITIES

(75) Inventor: David Hull, Pittsburgh, PA (US)

(73) Assignee: Xerox Corporation, Stamford, CT (US)

( * ) Notice: Subject to any disclaimer, the term of this patent is extended or adjusted under 35 U.S.C. 154(b) by 1029 days.

(21) Appl. No.: 09/737,964

(22) Filed: Dec. 18, 2000

(65) Prior Publication Data

US 2002/0111789 A1 Aug. 15, 2002

(51) Int. Cl.⁷ .......................... G06F 17/28; G06F 17/20; G10L 21/02; G10L 19/02
(52) U.S. Cl. ............................... 704/2; 704/277; 704/1
(58) Field of Search ........................... 704/277, 2, 10, 704/4, 5, 8

(56) References Cited

U.S. PATENT DOCUMENTS

| | | | | |
|---|---|---|---|---|
| 5,323,310 A | * | 6/1994 | Robinson ........................ | 704/2 |
| 5,418,717 A | * | 5/1995 | Su et al. ......................... | 704/9 |
| 5,477,451 A | * | 12/1995 | Brown et al. ................... | 704/9 |
| 5,523,946 A | * | 6/1996 | Kaplan et al. .................. | 704/2 |
| 5,680,511 A | * | 10/1997 | Baker et al. ................. | 704/257 |
| 5,907,821 A | * | 5/1999 | Kaji et al. ...................... | 704/4 |
| 5,956,711 A | * | 9/1999 | Sullivan et al. ................ | 707/6 |
| 6,041,293 A | * | 3/2000 | Shibata et al. ................. | 704/4 |
| 6,047,299 A | * | 4/2000 | Kaijima ....................... | 715/532 |
| 6,061,675 A | * | 5/2000 | Wical ........................... | 706/45 |
| 6,064,951 A | * | 5/2000 | Park et al. ...................... | 704/8 |
| 6,092,080 A | * | 7/2000 | Gustman ................ | 707/103 R |
| 6,236,958 B1 | * | 5/2001 | Lange et al. ................... | 704/8 |
| 6,330,530 B1 | * | 12/2001 | Horiguchi et al. ............. | 704/4 |
| 6,349,276 B1 | * | 2/2002 | McCarley ....................... | 704/8 |

OTHER PUBLICATIONS

Salton G., "Automatic translation of Foreign Language Documents", Computational Linguistics, pp. 1–28, Sep. 1969.*
Brown, Peter F. et al., "A statistical approach to Machine Translation", IBM, pp. 79–85, Jun. 1990.*
Sintichakis, Marios et al., "A Method for Monolingual Thesauri Merging", pp. 129–138, SIGIR, Jul. 1997.*
Ker, Sue J. et al., "A class–based approach to alignment", pp. 314–343, Computational Linguistics, vol. 23 Issue 2, Jun. 1997.*

(Continued)

Primary Examiner—Tālivaldis Ivars Šmits
(74) Attorney, Agent, or Firm—Oliff & Berridge, PLC

(57) ABSTRACT

The invention relates to a method and apparatus for generating translations of natural language terms from a first language to a second language. A plurality of terms are extracted from unaligned comparable corpora of the first and second languages. Comparable corpora are sets of documents in different languages that come from the same domain and have similar genre and content. Unaligned documents are not translations of one another and are not linked in any other way. By accessing monolingual thesauri of the first and second languages, a category is assigned to each extracted term. Then, category-to-category translation probabilities are estimated, and using said category-to-category translation probabilities, term-to-term translation probabilities are estimated. The invention preferably exploits class-based normalization of probability estimates, bi-directionality, and relative frequency normalization. The most important applications are cross-language text retrieval, semi-automatic bilingual thesaurus enhancement, and machine-aided human translation.

20 Claims, 6 Drawing Sheets

OTHER PUBLICATIONS

Kaji, Hiroyuki et al., "Extracting word correspondences from bilingual corpora based on word co–occurrences information", pp. 23–28 Proceedings of the 16th conference on Computational linguistics—vol. 1, Aug. 1996.*

Tanaka, Kumiko et al., "Extraction of lexical translations from non–aligned corpora", pp. 580–586 Proceedings of the 16$^{th}$ COLING, Aug. 1996.*

M. Franz, J.S. McCarley, and S. Roukos. Ad hoc and Multilingual Information Retrieval at IBM. Proc. of the Seventh Text Retrieval Conference (TREC7), pp. 157–168, 1999.

Pascal Fung and Lo Yuen Yee. An IR Approach For Translating New Words From Nonparallel, Comparable Texts. In Proc. of Coling/ACL, pp. 414–420, 1998.

Gregory Grefenstette. Explorations in Automatic Thesaurus Discovery. Chapter 5 Applications: pp. 101–135. Kluwer Academic Press, 1994.

David A. Hull. Automating The Construction Of Bilingual Terminology Lexicons. Terminology, 4(2):225–244, 1997.

Dekang Lin. Automatic Retrieval And Clustering Of Similiar Words. In Proc. of Coling/ACL, pp. 768–774, 1998.

P. McCullagh and J.A. Nelder. Generalized Linear Models, chapter 4, pp. 98–148. Chapman and Hall, 1989.

Carol Peters and Eugenio Picchi. Capturing The Comparable: A System For Querying Comparable Text Corpora. In Proc. of Analisi Statistica dei Dati Testuali (JADT), pp. 247–254, 1995.

Reinhard Rapp. Identifying Word Translation In Nonparallel Texts. In Proc. of the 35th ACL, student session, pp. 321–322, 1995.

B. Rehder, M.L. Littman, S. Dumais, and T.K. Landauer. Automatic 3–Language Cross Language Information Retrieval With Latent Semantic Indexing. In Proc. of the Sixth Text Retrieval Conference (TREC6), pp. 233–239, 1998.

Hinrich Schutze. Dimensions Of Meaning. In Proc. of Supercomputing, pp. 787–796, 1992.

Paraic Sheridan and Jean Paul Ballerini. Experiments In Multilingual Information Retrieval Using The SPIDER System. In Proc. of the 19th ACM/SIGIR Conference, pp. 58–65, 1996.

* cited by examiner

TERMINOLOGY TRANSLATION FOR UNALIGNED COMPARABLE CORPORA USING CATEGORY BASED TRANSLATION PROBABILITIES

BACKGROUND OF THE INVENTION

1. Field of the Invention

The invention generally relates to a method and apparatus for generating translations of natural language terms, and in particular to a corpus-based technique for translating unknown terminology in a specific domain.

2. Description of the Related Art

Presently, there are several important applications of terminology translation. The most common applications are Cross-Language Text Retrieval (CLIR), semi-automatic bilingual thesaurus enhancement, and machine-aided human translation.

In cross-language text retrieval, the goal is to be able to retrieve documents in response to a query written in a different language. The standard approach to CLIR is to translate the query into all possible target languages and then apply standard monolingual retrieval techniques. The most significant problem in CLIR is out-of-vocabulary terms, i.e. terms which do not appear in existing bilingual resources.

Semi-automatic bilingual thesaurus enhancement is needed because complete bilingual thesauri and terminology dictionaries do not exist in practice since new terms and new variants are always being created. Thus, it is a significant problem that bilingual thesauri are usually rather incomplete and not up to date. The same problem arises in performing machine-aided human translation.

Technical terminology is one of the most difficult challenges in translation. The ideal approach to translate such terms is to read extensively in the source language to understand what the new term means, then read extensively from similar material in the target language in order to discover the most appropriate translation. This is an extremely time-consuming process.

Therefore, several techniques have being developed for extracting translation equivalents from comparable corpora. Comparable corpora are sets of documents in different languages that come from the same domain and have similar genre and content.

All of these techniques represent words by term co-occurrence profiles. Term co-occurrence profiles have been used for monolingual applications, such as word sense disambiguation, and the use of term profiles generated by shallow parsers has also been explored for monolingual applications.

Comparable corpora are an important resource for cross-language text retrieval, and a number of methods for defining the similarity between terms in different languages have been developed, including similarity thesauri, latent semantic indexing, and probabilistic translation models. However, these approaches are all based on comparable corpora which are aligned at the document, paragraph, or sentence level. Aligned documents are translations of one another or are closely linked in some other way.

SUMMARY OF THE INVENTION

The present invention has been made in consideration of the above situation, and has as its primary object to provide a method and apparatus for generating translations of natural language terms capable of exploiting unaligned comparable corpora, i.e. documents which are not translations of one another and which are not linked in any other way.

It is another object of the present invention to extract lists of potential translations for unknown terminology from a specialized domain and to improve the quality of the retrieved set of potential translations.

In terminology translation techniques, potential translations of a term can be ranked in descending order of their probability scores and presented to the user. It is therefore still another object of the present invention to obtain a better ranking of potential translations.

A further object of the present invention is to provide improved translation applications such as cross-language text retrieval, semi-automatic bilingual thesaurus enhancement, and machine-aided human translation.

Another object of the present invention is to increase the translation speed especially in the process of translating technical terminology.

Still another object of the present invention is to provide a method and apparatus capable of being operated in an interactive system, thereby responding to user feedback in a manner allowing the user to work with the interactive system more easily.

These and other objects of the present invention will become apparent hereinafter.

To achieve these objects, the present invention provides a method of generating translations of natural language terms from a first language to a second language. The method comprises the steps of extracting a plurality of terms from unaligned comparable corpora of the first and second languages, assigning a category to each extracted term by accessing monolingual thesauri of the first and second languages, estimating category-to-category translation probabilities, and estimating term-to-term translation probabilities using said category-to-category translation probabilities.

According to a second aspect of the present invention, there is provided an apparatus for generating translations of natural language terms from a first language to a second language. The apparatus comprises a terminology extractor for extracting a plurality of terms from unaligned comparable corpora of the first and second languages. Further, the apparatus comprises a semantic classifier for assigning a category to each extracted term by accessing monolingual thesauri of the first and second languages. Moreover, the apparatus comprises a translation generation engine for estimating category-to-category translation probabilities and for estimating term-to-term translation probabilities using said category-to-category translation probabilities.

By using these approaches of the present invention, unaligned comparable corpora can be exploited using monolingual thesauri and by estimating category-to-category translation probabilities, i.e. class-based translation probabilities.

In preferred embodiments, further improvements can be achieved by additionally applying class-based normalization of probability estimates, by taking into account bi-directionality, and/or by applying relative frequency normalization.

In other preferred embodiments there is provided an iterative probabilistic method and apparatus for terminology translation.

This invention has its primary applications in cross-language text retrieval, semi-automatic bilingual thesaurus enhancement, and machine aided human translation.

BRIEF DESCRIPTION OF THE DRAWINGS

The accompanying drawings are incorporated into and form a part of the specification to illustrate several embodiments of the present invention. These drawings together with the description serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, wherein.

DETAILED DESCRIPTION OF THE INVENTION

The illustrated embodiments of the present invention will now be described with reference to the figure drawings.

Figure 1:
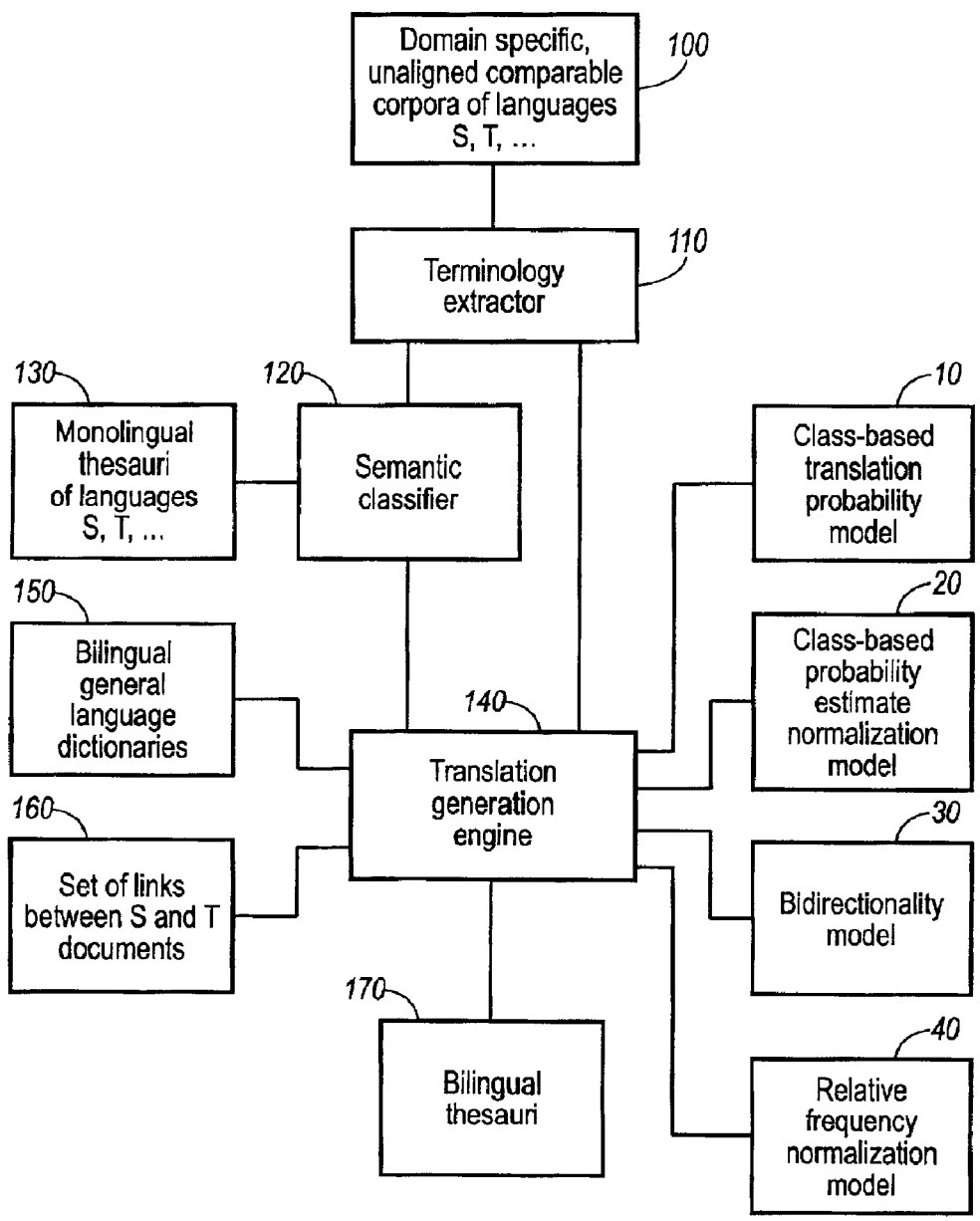
FIG. 1 illustrates a system in which the translation technique of the invention can be applied.

Referring now to the drawings and particularly to FIG. 1, which illustrates a preferred embodiment of a translation system, there is provided a terminology extractor 110 which might for instance be a software tool for automatic terminology extraction in languages S (source) and T (target) etc. The terminology extractor 110 has access to large corpora 100 in languages S and T specific to a certain domain with similar coverage of the domain.

The size of the corpora 100 required to make the invention work properly depends on the specificity of the domain. A very narrow domain, measured by the amount of specialized terminology, will require less text than a broader domain.

The corpora 100 are unaligned but comparable i.e. the corpora in the two languages S and T have similar coverage, that is they cover more or less the same subject matter within the domain. Obviously, an English corpus of heart disease and a German corpus of tropical diseases will not be satisfactory, even though both may come from the medical domain.

The system of FIG. 1 further comprises a semantic classifier 120 which again is preferably a software tool to classify new terminology into the classes defined by monolingual thesauri 130 for languages S and T. For convenience, the resources 130 will be called monolingual thesauri, although in practice they may be quite different from the traditional structured thesauri. For instance, it is within the scope of the present invention that monolingual thesauri 130 also include knowledge bases, structured terminology databases, or other classification schemes for the terms in the languages S and T covering the domain.

While the invention needs to have a monolingual thesaurus for each language, no bilingual or translational links are assumed between the two thesauri. Moreover, it is not necessary for the thesauri to completely cover the domain. The semantic classifier 120 can be used to automatically predict the class of unknown terms. The classifier 120 can be binary or probabilistic, i.e. it can express its predictions as vectors of probabilities of class membership.

Further, there is provided a translation generation engine 140 which receives the extracted terms from terminology extractor 110 and which further receives the assigned classes from the semantic classifier 120. The translation generation engine 140 is preferably further connected to bilingual general language dictionaries 150 for facilitating the translation between languages S and T and vice-versa.

Further, in a preferred embodiment of the invention, a set of links 160 between a document in language S and a document in language T for documents from the corpora 100 may be provided. Aligned documents in this resource 160 do not necessarily consist of a document and its translation. They may be independently written versions of the same event, or independent descriptions of the symptoms of the same disease, for example. If the aligned documents are indeed translations, this resource is even more valuable.

Finally, there is provided a bilingual thesaurus 170 which might for instance be a bilingual terminology dictionary, thesaurus, or classification scheme or a language-independent ontology specific to the domain. As will be described in more detail below, the invention is able to find a list of possible translations for terms which do not appear in the bilingual thesaurus.

As apparent from FIG. 1, the invention takes advantage of four sources of evidence which can be used to improve the translation probability estimates and which have not been used in the prior art techniques. These four new sources of evidence are class-based translation probabilities 10, class-based normalization of probability estimates 20, bi-directionality 30, and relative frequency normalization 40. These models will now be described in more detail, and their application will become apparent when discussing the process of estimating translation probabilities in more detail.

By using the monolingual thesauri 130, the semantic classifier 120 is capable of assigning a category to each term. Using existing term translation probabilities, a translation model for thesaurus categories can be developed. The model can either be built from scratch or used to enhance an existing bilingual thesaurus 170. In return, the category based translation model can be reapplied to the term translation model to improve the probability estimates. To give a general example, a term in the source language which is known to describe a type of disease is almost certain to be translated by a term in the target language describing a type of disease. Thus, by using model 10, the invention makes use of class-based (or category-to-category) translation probabilities.

The initial translation probability estimates treat each pair of words independently. However, there are certain strong dependencies in the data, particularly when conditioning on class membership. For example, a term which describes a disease and a term which describes a piece of medical equipment are unlikely to both be translations of the same term in the other language. Therefore, the probability estimates can be improved by performing some simple normalization steps. The most elementary hypothesis is that each term in the source language is translated by exactly one term in the target language. However, this hypothesis is clearly too restrictive even for a technical domain, where there is far less polysemy than in general language text.

Polysemous terms are terms with more than one meaning. Such terms may well have translations which come from more than one thesaurus category.

The above-mentioned hypothesis is too restrictive because terms have many variant forms and it is difficult to recognize and normalize for all such variations in advance. There is also the problem of granularity. A general term in one language, such as river, may by translated by several different terms rivière, fleuve in another language, each of which has a more specific meaning. Therefore, the model must be flexible enough to recognize that a term may have more than one translation.

The invention therefore provides with model 20 a class-based normalization of probability estimates, i.e. it makes the assumption that all translations of a term will come from the same thesaurus category. Term translation probabilities can then be re-normalized to satisfy this criterion. For example this might result in the condition: P(source language term=disease)+P(source language term=medical equipment)=1, where P denotes the probability value.

The bi-directional model 30 is provided to overcome the limitation that statistical translation models are almost always directional, reflecting the fact that the translation process starts with a source language and derives text in a target language. While this specification often refers to the concept of a source and a target language, in reality, this distinction is entirely arbitrary. The documents in both languages can be assumed to be original texts and not translations. Thus, the source/target concept can equally well be reversed without violating any of its basic assumptions. In fact, one can view the two directional models as complementary sources of information, and translation probabilities in both directions can be computed and combined. The resulting information can also be used to measure the uncertainty associated with a particular translation probability estimate.

Finally, the relative frequency of a term in the corpus can be measured by dividing the frequency of the term by the size of the corpus. This relative frequency normalization model 40 is based on the assumption that terms which describe the same concept should have similar relative frequencies when compared to unrelated terms. This assumption can for instance be tested using a training set of known correct and incorrect translations which will be described in more detail when discussing the process depicted in FIG. 5. If there is a sufficiently strong correlation between the frequency and the probability of being a correct translation, then a frequency-based component can be added to the translation model. This adjustment is helpful at the term level as well as at the class level.

The process of generating translations according to the present invention will now be described in more detail with reference to the flowchart diagrams.

Figure 2:
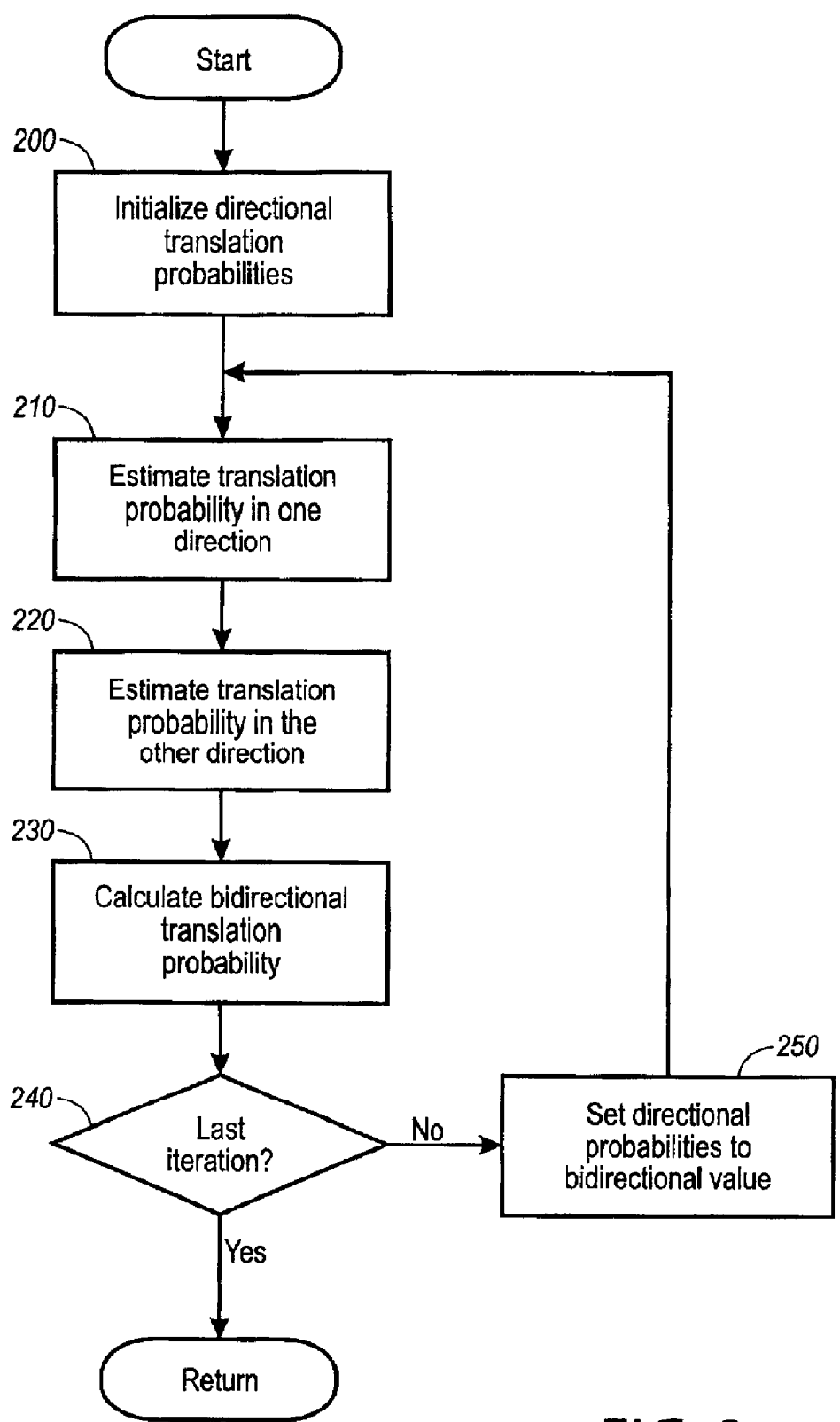
FIG. 2 is a flowchart illustrating an iterative algorithm according to a preferred embodiment of the present invention.

Turning now to FIG. 2, the process starts with an initialization step 200 which will be described in more detail with reference to FIGS. 3 to 5 below. This initialization step generates initial probability estimates P(s|t) and P(t|s) in both directions. After the directional translation probabilities have being initialized, the process performs an iterative algorithm to produce more accurate estimates of P(s|t) and P(t|s), and to merge them into a final bi-directional estimate of P(s⇌t) which gives the probability that the term s in language S and the term t in language T are translations.

Figure 3:
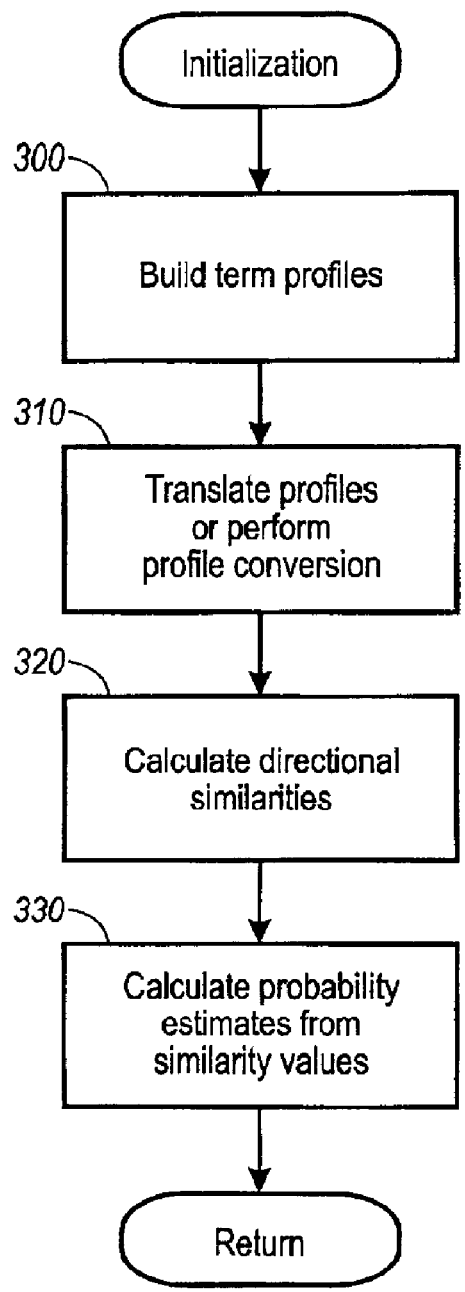
FIG. 3 is a flowchart illustrating in more detail the initialization step of the process depicted in FIG. 2.
Figure 4:
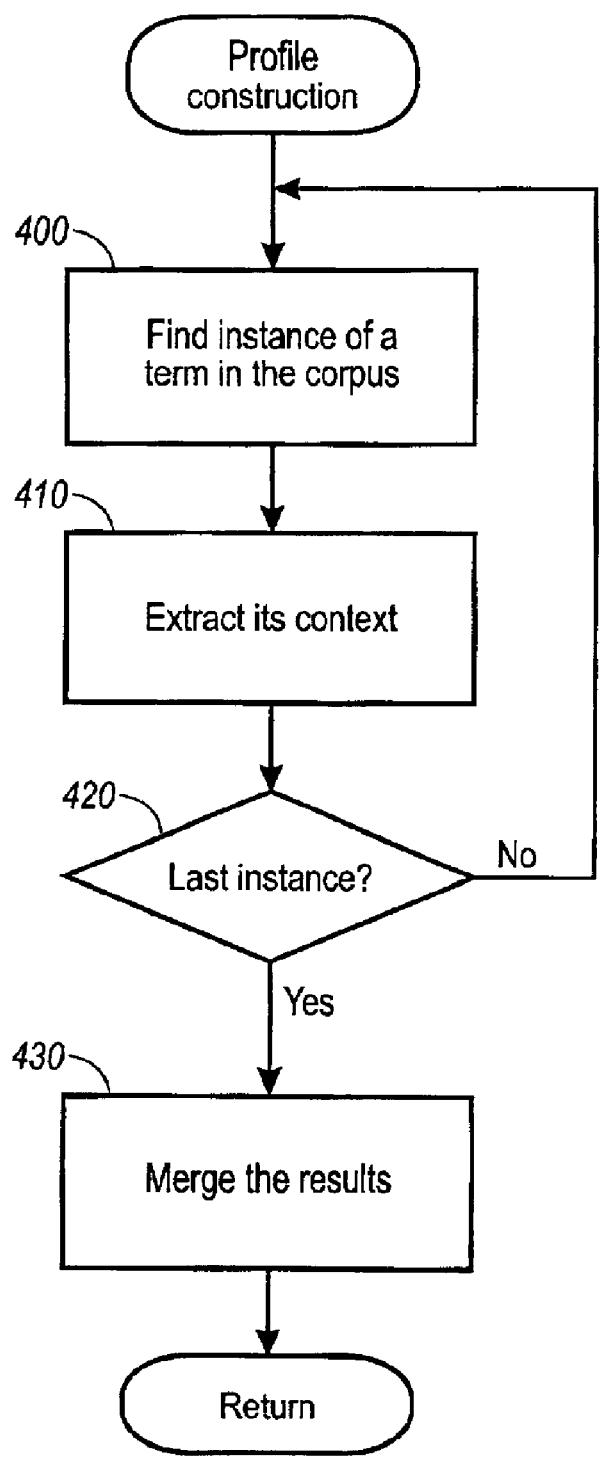
FIG. 4 is a flowchart illustrating in more detail the profile construction performed in the process depicted in FIG. 3.

Before discussing the iterative algorithm, reference is made to FIG. 3 which illustrates in more detail the initialization process. First, a profile for each term s in language S and each term t in language T is built in step 300. A lot of information about a term can be derived from its context. As apparent from FIG. 4, a term profile is constructed by taking each instance of a term in the corpus (steps 400, 420), extracting its context (step 410), and merging the results (step 430).

There are many possible approaches of how to define the representation of the context and what is the best merging strategy. For example, one possible representation of the context is the set of content words which occur within a number of words of an instance of the term. One possible merging strategy is to treat the context as an unordered vector of words and compute the centroid of the context vectors for all instances of the term. The context could also be defined as the set of all syntactic relations which involve the given term. The profile might then consist of word/relation pairs. The basic assumption is that terms with similar meaning will tend to have similar context profiles.

Term profiles are constructed independently in language S and language T, preferably using existing corpora 100. The profiles consist of words from the same language as the term they represent, so they cannot be immediately compared across languages. In order to define a cross-language similarity function, one can either translate the profile using the existing bilingual dictionary 150 or convert both profiles to a language independent representation (step 310). This can for instance be done based on bilingual thesauri 170.

Once profiles in language S and language T have a common representation, the similarities Sim(s,t) and Sim(t, s) between term s and term t can be estimated in step 320 using a profile scoring function. For this purpose, one can choose an appropriate similarity function. For example, one could compute the inner product of the context vectors. If profiles are converted by translation, then there are two possible directions, from S to T or from T to S. Therefore, one can obtain two different values for the similarity function.

In the subsequent step 330, the similarity scores are converted into probability estimates. This process is illustrated in FIG. 5. The first steps are to build or acquire a training set of known correct and incorrect translations. A list of correct translations can be derived from the existing bilingual resources 150, 170. A list of incorrect translations will need to be constructed manually or semi-automatically. One can then fit a mapping function between a score and a probability using a standard function estimation technique such as logistic regression (step 530). For this transformation to give accurate results, the similarity scores must first be normalized in such a way that they are comparable for unrelated word pairs (step 520).

Figure 5:
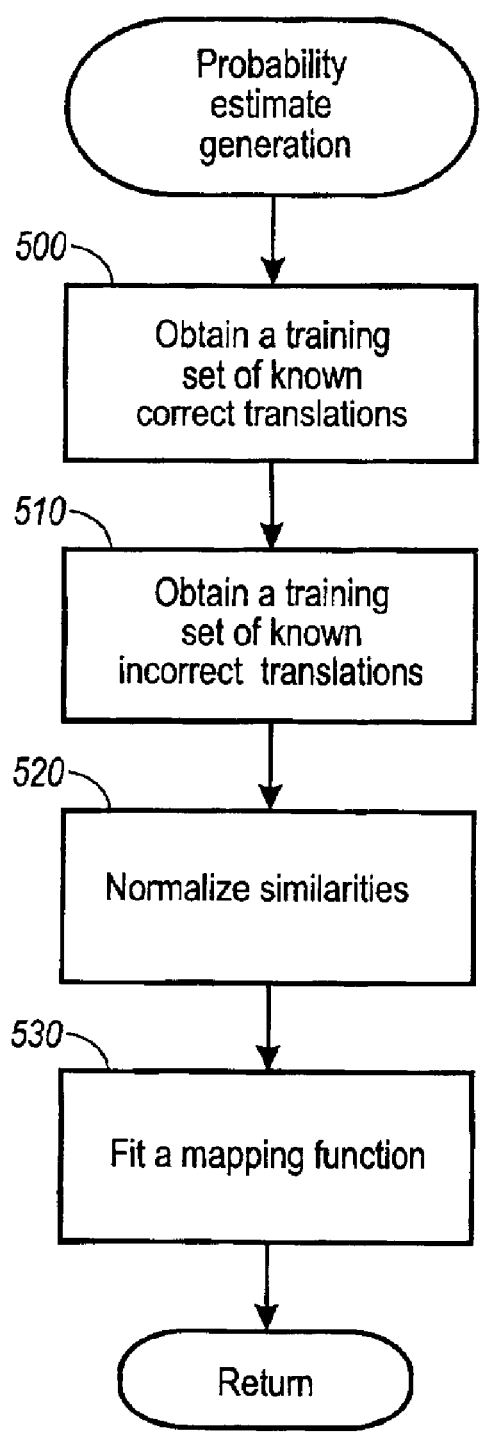
FIG. 5 is a flowchart illustrating in more detail the probability estimate generation performed in the process depicted in FIG. 3.

Thus, by using the process of FIG. 5 in step 330, the directional similarities Sim(s,t) and Sim(t,s) are converted into initial probability estimates P(s|t) and P(t|s). These initial probability estimates can then be used in the iterative algorithm of FIG. 2 which will now be described in more detail.

As apparent from FIG. 2, the iterative algorithm starts with estimating directional translation probabilities in both directions (steps 210, 220). This will be discussed in more detail later when turning to FIG. 6.

Let $P^i(s|t)$ be the probability in iteration i that the term s is a possible translation of the term t, and $P^i(t|s)$ the probability that t is a possible translation of s. Then the steps 210 and 220 generate new values $P^{i+1}(s|t)$ and $P^{i+1}(t|s)$. Using these directional translation probabilities, a bi-directional translation probability $P^{i+1}(s \rightleftharpoons t)$ is then calculated in step

230. This is preferably done by estimating the overall term translation probability by the geometric mean of the directional term translation probabilities:

$$P^{i-1}(s \Leftrightarrow t) = \sqrt{P^{i-1}(s|t) \cdot P^{i+1}(t|s)}.$$

It is then determined in step 240 whether the iterative algorithm is assumed to stop. Preferably, the algorithm will run for a fixed number of iterations. If this number has not yet been reached, the process continues with step 250. In this step the directional probabilities are set to the bi-directional value:

$$P^{i+1}(s|t) = P^{i+1}(t|s) = P^{i+1}(s \Leftrightarrow t),$$

and the process returns to step 210.

Figure 6:
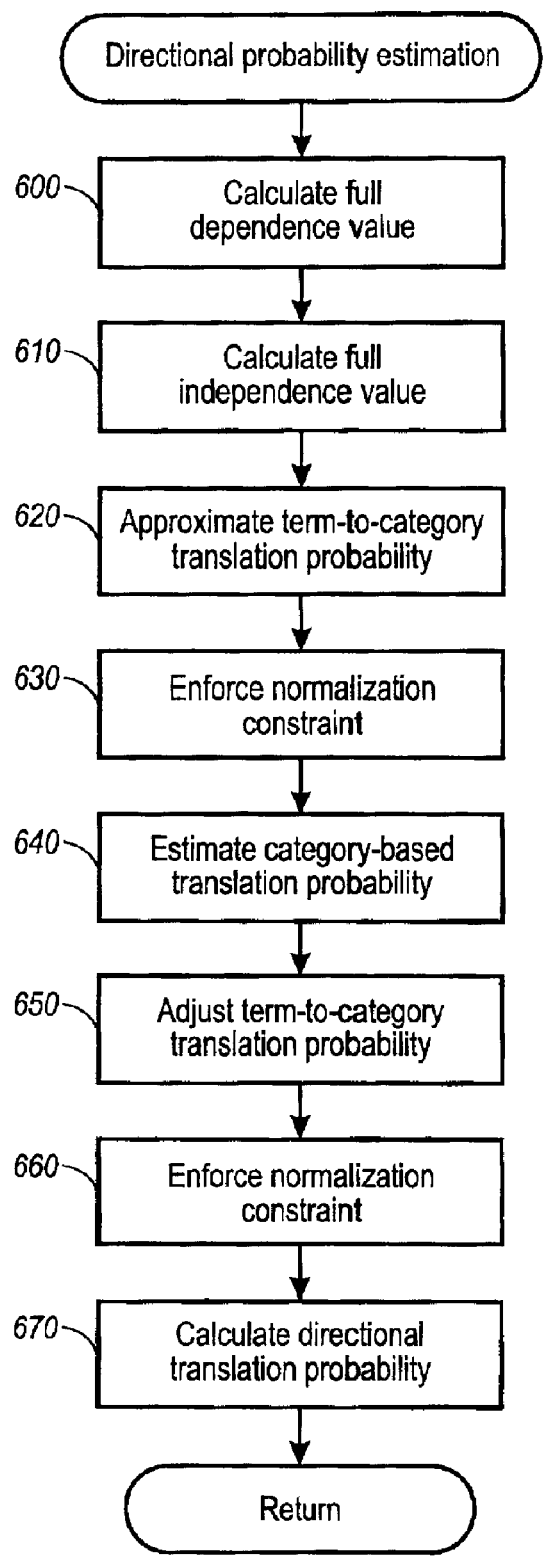
FIG. 6 is a flowchart illustrating a preferred embodiment of the process of estimating directional translation probabilities, performed in the process depicted in FIG. 2.

The estimation of directional probabilities in steps 210 and 220 each perform, in the preferred embodiment of the invention, the process depicted in FIG. 6.

Let $C_s$ be the category of term s, $C_t$ the category of term t, and $P(C_t|s)$ the probability that a translation of s comes from category $C_t$. The categories $C_s$ and $C_t$ are obtained by applying the semantic classifiers 120 to s and t respectively.

The process of estimating directional translational probabilities then starts with estimating term-to-category probabilities. In step 600, full dependence between the terms in category $C_t$ is assumed:

$$P_D^i(C_t | s) = \max_{t' \in C_t} P^i(t' | s)$$

while in step 610 full independence is assumed:

$$P_I^i(C_t | s) = 1 - \prod_{t' \in C_t} (1 - P^i(t' | s)).$$

Since the true term-to-category translation probability is somewhere in between, an approximation is then done in step 620 using a global tuning constant $c_0$. This is preferably done by taking the linear combination of the full dependence and the full independence values:

$$P^i(C_t|s) = c_0 \cdot P_D^i(C_t|s) + (1 - c_0) \cdot P_I^i(C_t|s).$$

Using the approximated term-to-category translation probability, the normalization constraints described above can be enforced (step 630):

$$P_n^i(C_t | s) = P^i(C_t | s) \Big/ \sum_{C_j \in \{C_j\}} P^i(C_t | s)$$

where $$\Sigma P(C_t|s) = 1 \text{ and } \Sigma P(C_t|t) = 1.$$

Then, in step 640, class-based translation probabilities (i.e. category-to-category translation probabilities) are estimated. This is preferable done by solving the equation $$P^i(C_t | C_s) = \sum_{s' \in C_s} P_n^i(C_t | s', C_s) \cdot P_i(s' | C_s) \approx \sum_{s' \in C_s} P_n^i(C_t | s') \cdot P_i(s' | C_s)$$

where $P(s'|C_s)$ can be estimated from the corpus frequency counts for each terms s' in $C_s$.

The term-to-category translation probabilities are then adjusted in step 650 towards the class-based translation probability:

$$P^{i+1}(C_t|s) = \lambda_i \cdot P^i(C_t|s) + (1 - \lambda_i) \cdot P^i(C_t|C_s).$$

The tuning constant $\lambda_i$ will shrink to zero as the number of iterations increases to promote the stability in the final estimates.

After enforcing the normalization constraint in step 660

$$P_n^{i+1}(C_t | s) = P^{i+1}(C_t | s) \Big/ \sum_{C_j \in \{C_j\}} P^{i+1}(C_t | s)$$

the directional translation probability is calculated in step 670. This is done by solving the equations used in steps 600 to 620 for $P^{i+1}(t'|s)$ for all terms t' in category $C_t$, given the constraints $$P^{i+1}(t'|s) = k_i \cdot P^i(t'|s) \text{ for all } t' \in C_t.$$

The process of FIG. 6 is performed in step 210 for all terms s and for all categories $C_t$. In step 220, the process is performed for all terms t and for all categories $C_s$.

In another preferred embodiment, the normalization constraints enforced in steps 630 and 660 are replaced with a more general assumption $$\sum P(C_t | s) = \sum_n n \cdot \Phi_s(n)$$

where $\phi_s(n)$ is the probability that term s has valid translations in n different categories. The basic model assumes $\phi_s(1) = 1.0$, and $\phi_s(n) = 0$ for all other values of n.

This assumption is in particular advantageous if there are many polysemous terms in the corpus. Further, it is especially advantageous in case the thesaurus categories in one language are much more precise than the categories in the other language. A term with a general meaning in one language may well have multiple precise translations in the other language which come from different categories.

The estimation of $\phi$ will now be described.

If $P(s|t) \gg P(t|s)$ for terms from two or more classes $C_t$ then it is possible that s could be translated by terms from all of these classes. For example, considering the French word argent and two possible English translations, silver and money, it is likely the $P(\text{argent}|\text{silver}) = P(\text{argent}|\text{money}) = 1$, while $P(\text{silver/argent}) = 0.2$ and $P(\text{money/argent}) = 0.8$ if money and silver belong to different semantic classes, due to the initial normalization constraint. In this case, it is $\phi(2) = 1.0$ for the term argent. This model can also recognize that some terms may not be translated by allowing $\phi(0) > 0$.

While the invention has been described referring to a single language pair (S, T), it will be appreciated by those of ordinary skill in the art that the technique according to the present invention may likewise be applied to a larger set of languages on a pair-wise basis.

As apparent from the foregoing, the invention allows for extracting a ranked list of potential translation alternatives for an unknown technical term, i.e. a term which has no translations in existing bilingual resources. This is done by estimating class-based translation probabilities (category-to-category translation probabilities) and using this information to improve estimates on word-based translation probabilities. In this process, the classes come from monolingual thesauri. It will be appreciated, that the described technique can be extended to serve as a general method for cross-language information retrieval. Further, the invention can be used in conjunction with human experts to semi-automatically construct a bilingual thesaurus for a new domain. The invention can also be used to help human translators translate unknown technical terms.

Using the invention in cross-language text retrieval, the algorithm would help the system to produce a set of plausible translation alternatives for out-of-vocabulary terms. A list of the most likely translations could be integrated directly into the retrieval model without manual intervention.

Another important application is thesaurus linking. Monolingual thesauri tend to be much more complete and up to date than their bilingual counterparts for most domains. The class-based translation probabilities $P(C_s|C_t)$ and $P(C_t|C_s)$ can be used to automatically estimate links between different thesaurus classes. This information can either be used directly for concept-based cross-language text retrieval or serve as a starting point for semi-automatic bilingual thesaurus enhancement.

Another important advantage of the invention is that the algorithm can substantially speed the process by proposing a list of likely translated alternatives and providing pointers to texts which use the terms.

Further preferred embodiments may be derived when using the invention to help human translators. Using the translation probabilities estimated by this technique, every document, section, or paragraph could be scored according to the likelihood that it contains a correct translation. The most highly ranked pieces of text are those which the translator should read first, and potentially promising terms can be highlighted in the text. This is nearly equivalent to the cross-language text retrieval problem. The algorithm described here exploits training data to estimate the translation probabilities in an iterative manner. Therefore, another preferred embodiment involves an interactive system which responds to user feedback. For example, if the top ranked proposed translation is marked correct or incorrect by the user, the system could immediately retain or filter out all other translations which come from the same thesaurus category.

While the invention has been described with respect to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A method of generating translations of natural language terms from a first language to a second language, the method comprising the steps of:
   a) extracting a plurality of terms from unaligned comparable corpora of the first and second languages;
   b) assigning a category to each extracted term by accessing monolingual thesauri of the first and second languages;
   c) estimating category-to-category translation probabilities; and
   d) estimating term-to-term translation probabilities using said category-to-category translation probabilities.

2. The method of claim 1, wherein estimating said term-to-term translation probabilities includes performing a category-based normalization of term-to-category translation probabilities.

3. The method of claim 2, wherein the category-based normalization is based on a plurality of probability values indicating for each extracted term the probability that the term has a valid translation in more than one category.

4. The method of claim 1, wherein estimating said category-to-category translation probabilities is performed separately for each extracted term of the first language and each category assigned to extracted terms of the second language.

5. The method of claim 1, wherein said term-to-term translation probabilities are directional probabilities.

6. The method of claim 5, wherein for each pair of extracted terms of the first and second languages the directional probabilities are estimated in both directions, and the method further comprises calculating for each pair bi-directional translation probabilities.

7. The method of claim 1, wherein estimating said category-to-category and/or term-to-term translation probabilities includes measuring for each extracted term its relative frequency in the respective corpus.

8. The method of claim 1, further comprising the step of initializing translation probabilities and using the initialized translation probabilities for estimating said category-to-category and/or term-to-term translation probabilities.

9. The method of claim 1, wherein estimating said category-to-category and term-to-term translation probabilities is performed iteratively, thereby using the estimated term-to-term translation probabilities of one iteration for estimating the category-to-category translation probabilities of the next iteration.

10. The method of claim 1, wherein estimating said category-to-category and/or term-to-term translation probabilities includes accessing a bilingual general language dictionary.

11. The method of claim 1, wherein estimating said category-to-category and/or term-to-term translation probabilities includes accessing a bilingual thesaurus.

12. The method of claim 1, wherein estimating said category-to-category and/or term-to-term translation probabilities includes accessing a set of aligned documents.

13. The method of claim 1, applied to a plurality of more than two languages on a pair-wise basis.

14. The method of claim 1, wherein estimating said category-to-category and/or term-to-term translation probabilities is performed interactively, responding to user feedback.

15. The method of claim 1, applied in a cross-language text retrieval system.

16. The method of claim 1, applied for semi-automatic bilingual thesaurus enhancement.

17. The method of claim 1, applied in a machine-aided human translation system.

18. An apparatus for generating translations of natural language terms from a first language to a second language, comprising:
   a) a terminology extractor for extracting a plurality of terms from unaligned comparable corpora of the first and second languages;
   b) a semantic classifier for assigning a category to each extracted term by accessing monolingual thesauri of the first and second languages; and
   c) a translation generation engine for estimating category-to-category translation probabilities and estimating term-to-term probabilities using said category-to-category translation probabilities.

19. The apparatus of claim 18, wherein said term-to-term translation probabilities includes a category-based normalization of term-to-category translation probabilities.

20. The apparatus of claim 19, wherein the category-based normalization is based on a plurality of probability values that indicate for each extracted term the probability that the term has a valid translation in more than one category.

* * * * *